United States Patent

[11] 3,572,961

| [72] | Inventor | George E. Medawar |
| | | San Diego, Calif. |
| [21] | Appl. No. | 840,402 |
| [22] | Filed | July 9, 1969 |
| [45] | Patented | Mar. 30, 1971 |
| [73] | Assignee | Rohr Corporation |
| | | Chula Vista, Calif. |

[54] COMPRESSOR NOISE-SUPPRESSION SYSTEM
14 Claims, 5 Drawing Figs.

[52] U.S. Cl. .................................................... 415/119,
137/5.1, 60/269
[51] Int. Cl. ..................................................... F01d 5/10
[50] Field of Search ........................................ 415/119;
137/15.1, 15.2; 181/33.21; 60/269

[56] References Cited
UNITED STATES PATENTS
3,347,496   10/1967   Opfer Jr. ........................ 137/15.1
3,477,231   11/1969   Paulson ........................... 60/269
3,490,472   1/1970    Dawson et al. ................. 137/15.1

*Primary Examiner*—C. J. Husar
*Attorney*—George E. Pearson

ABSTRACT: Basic purpose of system is to prevent "line of sight" emission of compressor whine sound waves out through entrance throat of typical engine cowl. Peripheral series of vanes pivoted at leading edge to inner wall of cowl swing toward axis to block axial emission of sound waves and also cut off ingress of air. Peripheral auxiliary air inlet passage means is provided at locus aft of leading edge to allow lateral inflow of air when normal path is blocked. A blocking ring normally overlies inlet passage and moves axially forward to uncover it. Deployment of ring causes deployment of vanes. Sound suppression surfacing is applied to rear faces of vanes and throat of auxiliary inlet passage. Total area of auxiliary passage is approximately equal to area of cowl inlet throat.

Patented March 30, 1971

INVENTOR.
GEORGE E. MEDAWAR

BY
Edwin D. Grant

ATTORNEY

INVENTOR.
GEORGE E. MEDAWAR

BY Edwin D. Grant

ATTORNEY

COMPRESSOR NOISE-SUPPRESSION SYSTEM

BACKGROUND OF THE INVENTION

This invention lies in the field of gas turbine or jet engines which produce reaction thrust by ejecting a high velocity stream of gas from the exhaust nozzle or tail pipe of the gas turbine. The turbine operates at very high rotational speed and derives its air supply from an axial flow compressor driven by the turbine and normally located directly forward of the turbine in the same nacelle or other streamlined housing. The compressor blades, because of their high rotational speed, produce a very high sound intensity or noise at a very high pitch within the audible range.

During takeoff and climb, when the engine is operating at or near full power, the exhaust from the engine produces noise of such intensity that it practically drowns out the compressor noise. However, during approach and landing as well as ground maneuvering, the engine power and its exhaust noise are far below their maximum while rotational speed is still very high and the compressor noise or whine is close to its maximum and is very objectionable. The invention is directed to means for reducing this objectionable noise, and more particularly to a system for blocking the "line of sight" or axially forward emission of the noise through the throat of the cowl. Various schemes have been proposed for producing stationary tortuous paths for air entry which would block axial sound emission but they are not considered satisfactory because they penalize airflow efficiency throughout all regimes of flight.

SUMMARY OF THE INVENTION

The present invention provides a very satisfactory solution to the problem because it is adjusted to operative position only when needed and provides complete blockage of axial noise emission while maintaining an adequate path for inflow of air. In its stowed or inoperative position it is substantially flush with adjacent walls and imposes no penalty on cruise performance of the engine. Generally stated, the system includes the cowl which forms the forward portion of the engine and compressor housing which is generally cylindrical and coaxial with the turbine and compressor, and peripherally arranged lateral inlet passage means at a locus somewhat aft of the leading edge of the cowl. The passage means may be a series of separate openings but in the presently preferred form it is a substantially complete annular passage. Blocking means are provided to close the openings or the single annular passage. In the latter case the means comprises a ring which overlies the inlet passage at the outer surface of the cowl and is movable axially to uncover the passage.

In addition a series of peripherally arranged vanes are pivoted at their leading edges to the inner surface or wall of the cowl. In stowed position they lie substantially flush along the inner wall of the cowl and overlie the inner end of the passage or passages. When deployed, the trailing edges of the vanes are swung toward the compressor axis to define a panel completely blocking axial forward egress of sound waves emitted by the compressor.

Since the deployed vanes also block ingress of ambient air along its normal path through the inlet throat of the cowl, they are connected to the blocking ring in such manner that the ring has almost completely uncovered the outer end of the auxiliary passage before the vanes begin to close the main passage. Thus there is no lack of air supply for the engine at any time.

The rear faces of the vanes, which face the compressor when they are deployed, are provided with a sound-absorbing surfacing to absorb an appreciable amount of the sound waves which strike it. Since the vanes are angled inwardly and rearwardly, the reflected waves strike the rear wall of the auxiliary passage which is similarly coated to absorb an additional amount of the waves. The remaining waves scatter out laterally and their intensity in any given direction is greatly reduced.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENT

Figure 1:
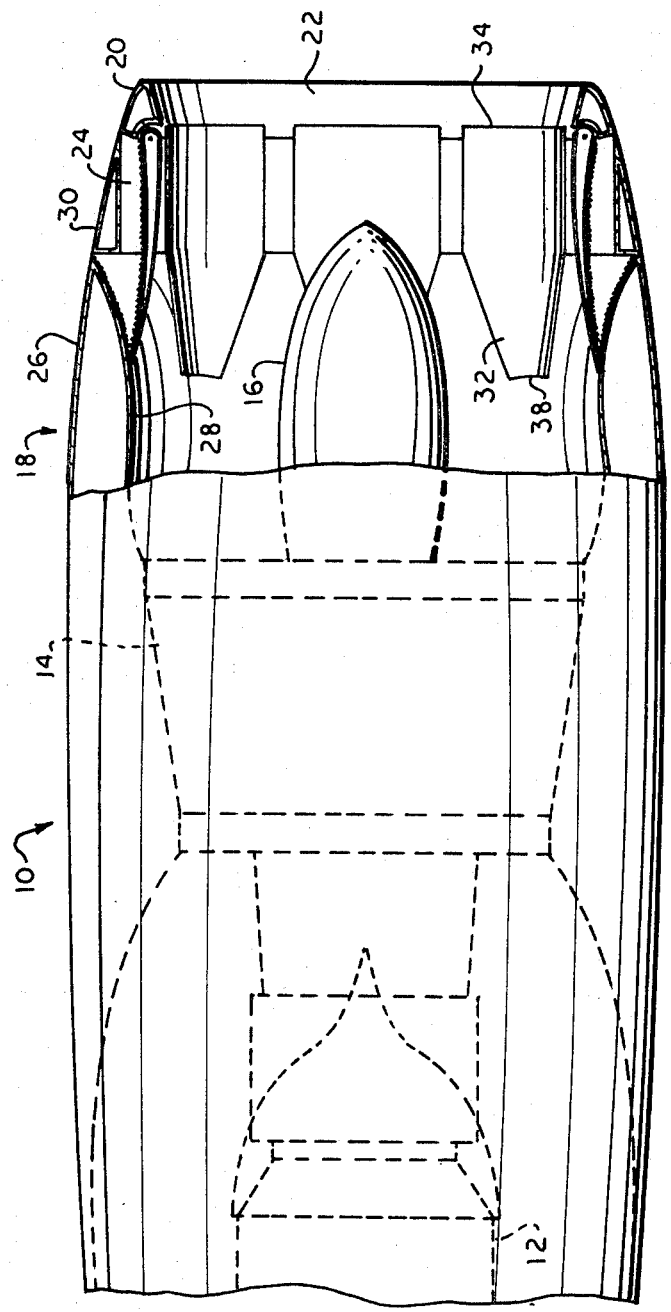
FIG. 1 is a schematic side elevational view, partly in section, of an engine and compressor housing incorporating the invention in stowed position.

The general arrangement illustrated in FIG. 1 shows the elements of the system in stowed position for normal operation or cruising flight. Streamlined housing 10 encloses engine 12 and compressor 14 and is generally coaxial with them. An air-diverting center body 16 of circular cross section is coaxial with the compressor and extends forwardly therefrom. The forward portion 18 of housing 10 constitutes a cowl having a leading edge 20 and an inlet throat 22 through which ambient air normally passes to the compressor. The sound waves emitted by the compressor in an axially forward direction, often called compressor whine, pass outwardly through throat 22.

Peripherally arranged auxiliary air inlet passage means 24 extends through the wall of cowl 18 from the outer surface 26 to the inner surface 28 at a locus somewhat rearward or downstream of leading edge 20 to provide a path for lateral inflow of air to supply the engine when the normal flow path is blocked. This may be a series of discrete openings but preferably is a substantially complete annular opening.

In the preferred form with a single annular opening, blocking means is provided in the form of an annular ring 30 which, in stowed position, overlies the opening at the outer surface 26 and is flush with the surface. To uncover the opening or passage 24, ring 30 is moved axially. The movement may be rearward but is preferably forward to the position shown in FIG. 2, where it extends forward of the leading edge 20 to provide maximum opening of the passage. If there are a plurality of discrete openings, then there are an equal number of ring segments which may be operated in the same manner.

Figure 3:
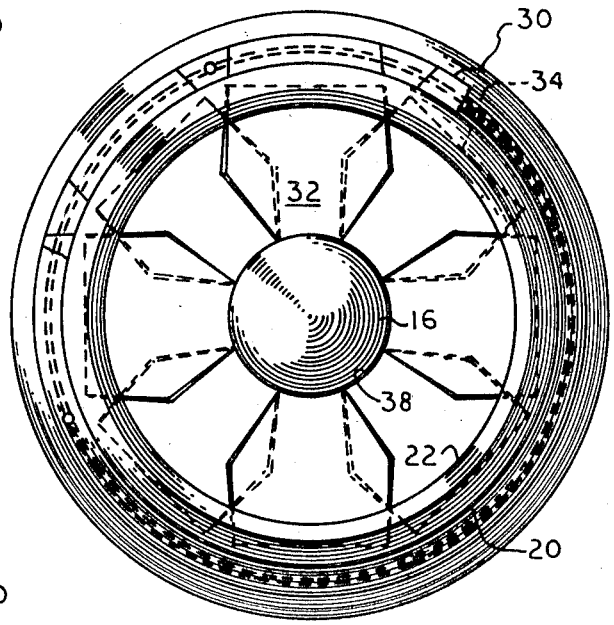
FIG. 3 is a front elevational view of the structure shown in FIG. 2.

The balance of the multiple blocking means comprises a series of vanes 32 arranged around the periphery of the inner surface 28 of the cowl and pivoted at their leading edges 34 on pivots 36, FIG. 3, substantially tangential to the curvature of the cowl. In stowed position, each vane extends in an axial direction across the inner end or exit of the passage 24, as shown in FIG. 1, to complete the streamline contour of the inner surface 28 of the cowl. It will be seen that in the position of FIG. 1 the multiple blocking means are substantially flush with the inner and outer surfaces of the cowl, and passage 24 is effectively blocked against lateral entry of ambient air.

Figure 2:
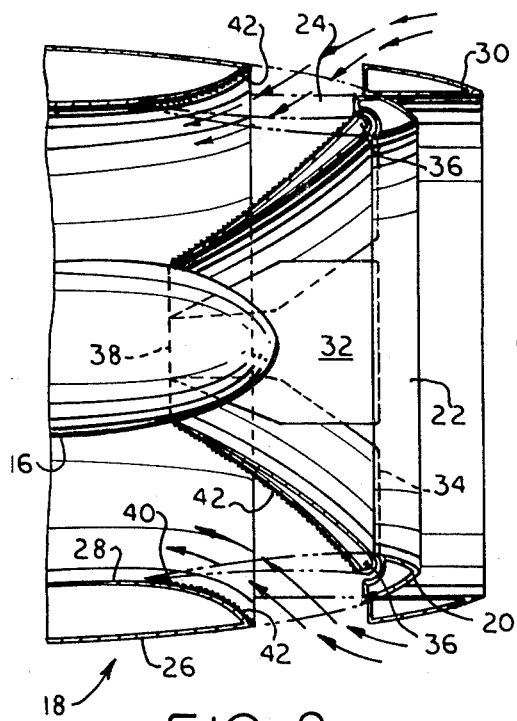
FIG. 2 is a view similar to FIG. 1 showing the multiple blocking means in deployed position.

The deployed positions of the blocking means are shown in FIGS. 2 and 3. Ring 30 extends forward of the cowl-leading edge 20 and vanes 32 have been swung about their pivots 36 to extend inwardly and rearwardly in conical fashion, with their trailing edges 38 in contact with center body 16. The trailing edges are arcuate to fit snugly against the surface of the center body. By reference to FIG. 3, it will be seen that the vanes are of sufficient width to overlap throughout substantially their entire lengths to insure practically complete closure against the passage of sound waves. In the case of a short center body the vanes may be made substantially triangular so that they will meet at the engine axis to complete the barrier.

Referring again to FIG. 2, it will be seen that the frustoconical but slightly curved shape of the deployed vanes forms the major part of the forward wall of the throat of passage 24 and that the portion 40 of the cowl is correspondingly curved to form the rear or aft wall of the throat, the two combining to define a smooth laterally inwardly and rearwardly directed flow path for ambient air.

When the blocking means are deployed as in FIG. 2, the axially forwardly directed sound waves strike the rear faces of vanes 32. Initial sound suppression is achieved by the provision of suitable sound-absorbing surfacing 42 on the rear surface of each vane. A large proportion of the reflected sound waves strike surface 40 and some of them are absorbed by the same type of surfacing 42 coated thereon. The balance of the sound waves exit through passage 24 and are scattered or diffused in all directions so that the intensity of sound radiated in any one direction is greatly reduced.

Figure 4:
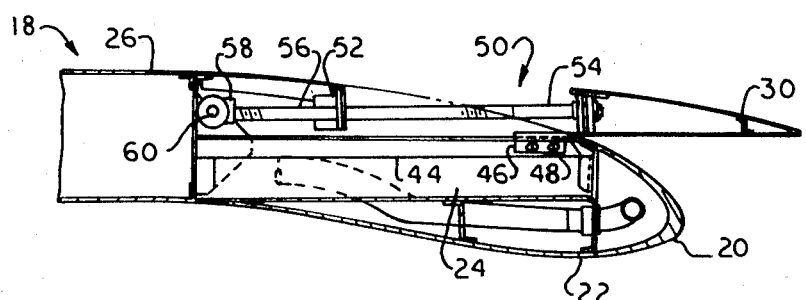
FIG. 4 is a schematic detail view of the mounting and operating means for the blocking ring.

Apparatus for deploying and stowing the closure ring 30 is schematically shown in FIG. 4. At spaced points around the periphery of the cowl, T-shaped tracks 44 extend axially across passage 24. On each track is mounted a carrier 46, provided with rollers 48 if desired, which travels fore and aft on the track and is attached to the rear margin of ring 30. A telescoping screw jack 50, rotatably mounted in bearing 52, has its forward end 54 connected to the ring and its aft end 56 mounted in gear box 58. A rotatable shaft 60 is also mounted in the gear box and suitable gearing, not shown, connects it to end 56 to cause rotation thereof and suitable actuation of the screw jack. All of the shafts 60 are connected through the series of gear boxes to produce synchronized actuation of the screw jacks and suitable pilot operated means, not shown, controls the actuation of the shafts 60.

Figure 5:
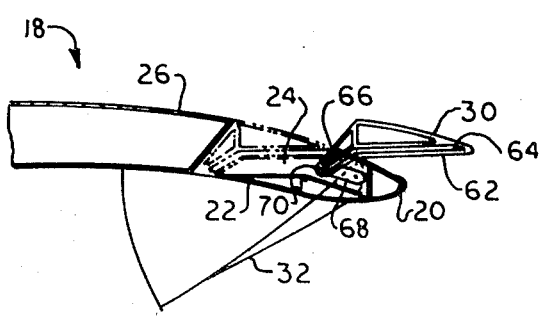
FIG. 5 is a schematic detail view of the interconnection between the ring and one of the vanes.

It is essential in order to avoid any deleterious effect on engine performance to insure that the air supply is not reduced at any time during the deployment of the blocking means and the changeover from one airflow path to the other. Mechanism to satisfy this requirement is shown in FIG. 5. Ring 30 is actuated by the mechanism shown in FIG. 4. At spaced points around the periphery, the ring is provided with a plurality of cam actuators 62. Each actuator is formed with an elongate cam track comprising a relatively long forward section 64 which is axially directed and a relatively short aft section 66 which is inwardly and rearwardly directed. A lever or horn 68 is fixedly connected to the leading edge of each vane 32 and carries at its free end a pin or cam follower 70 adapted to ride in the cam track.

When the ring is in its stowed position, indicated by dotted lines, pin 70 is at the forward end of the forward cam section 64 and vane 32 is in its stowed position flush with the inner wall of the cowl. As the ring moves forward, pin 70 continues to ride in section 64 and the vane remains stowed until the ring has traveled a major portion of its deploying distance such as about 75 80 percent. Consequently, passage 24 is already about three fourths open. During the last portion of the forward movement of the ring, pin 70 is engaged by cam track section 66 and is moved inwardly, causing the vane to move correspondingly. Consequently, the last quarter of the passage opening is accomplished during the total deploying movement of the vane and there is no time when an adequate airflow path is not available. The reverse operation is equally effective because the vanes are fully stowed and the cowl throat is wide open while the auxiliary inlet passage is still three-fourths open.

It will be apparent that the present invention as described above provides a simple and highly satisfactory system for greatly suppressing compressor noise with very few moving parts, resulting in minimum repair and maintenance problems and adding very little weight to the airplane.

I claim:

1. A noise-suppression system for use in combination with a jet engine having a noise-producing air compressor at its forward end and encased in a streamlined housing, comprising: an annular cowl forming the forward end of said housing and having an annular leading edge; said cowl being generally cylindrical and coaxial with said compressor to define a generally cylindrical normally open conduit for rearward flow of ambient air into the compressor while allowing compressor noise to be emitted axially forward to the exterior; peripherally arranged auxiliary air inlet passage means extending through the wall of the cowl at a locus rearward of the leading edge; and multiple blocking means lying across said passage means in a first, stowed and blocking position; at least a part of said blocking means serving to prevent flow of air therethrough; said blocking means being movable to unblocking position to allow air to flow inward through said passage means and block the emission of sound waves axially forward through said conduit.

2. A system as claimed in claim 1; said blocking means including slidable means lying across the passage means at the outer surface of the cowl and swingable means lying across the passage means at the inner surface of the cowl; said swingable means being movable to a deployed position extending inwardly toward the axis of the cowl.

3. A system as claimed in claim 2; including sound suppression surfacing on the portions of the swingable means which face toward the compressor in deployed position; and further sound suppression surfacing on the portions of the passage means which lie in opposition to the deployed swingable means.

4. A system as claimed in claim 1; said passage means comprising a substantially complete annular passage opening through the inner and outer surface of the cowl wall and shaped to define a generally conical rearwardly and inwardly directed flow path for entrance of the ambient air.

5. A system as claimed in claim 4; the inlet area of said annular passage being substantially equal to the frontal inlet area of said cowl.

6. A system as claimed in claim 4; said blocking means including a closure ring having a first, stowed position overlying the entrance to said passage and movable axially to a deployed position uncovering the entrance; said blocking means further including a plurality of elongate vanes spaced around the periphery of the inner surface of the cowl and extending in a first, stowed position in an axial direction across the exit from said passage; said vanes being pivotally mounted to said cowl at their leading edges about axes substantially tangential to the curvature of the cowl and swingable to deployed positions extending inwardly toward the cowl axis to act as barriers to forward axial emission of sound waves from the compressor.

7. A system as claimed in claim 6; said vanes in deployed position extending inwardly and rearwardly to define a generally frustoconical contour and forming the forward wall of the inlet passage throat.

8. A system as claimed in claim 6; and common pilot-operable servo means to cause all of said blocking means to move between their stowed and deployed positions.

9. A system as claimed in claim 8; said servo means being directly connected to said ring to move it toward its first and second positions; and interconnecting means between the ring and the vanes to cause them to move in response to movement of the ring.

10. A system as claimed in claim 9; said interconnecting means including a cam and a cam follower configured to cause deployment of the vanes only during the final portion of the deployment of the ring.

11. A system as claimed in claim 6; and an air-diverting center body coaxial with said compressor and extending forward therefrom; the trailing edges of said vanes in deployed position contacting said center body to complete the blocking of said axially emitted sound waves.

12. A system as claimed in claim 11; said center body being generally circular in cross section and said trailing edges being arcuate to provide line contact with the center body.

13. A system as claimed in claim 6; the widths of said vanes being sufficient to provide overlapping of their margins in deployed position throughout substantially their entire lengths to insure impermeability to the passage of sound waves.

14. A method of suppressing the noise produced by a jet engine compressor and emitted axially forwardly through the inlet of the throat of the cowl, said cowl having normally blocked lateral passageways for the flow of air into the throat, comprising: the steps during landing and takeoff of unblocking the passageways in the cowl for passing air laterally into the throat; and blocking the inlet throat against ingress of air and egress of axially directed sound waves.